Patented Oct. 19, 1937

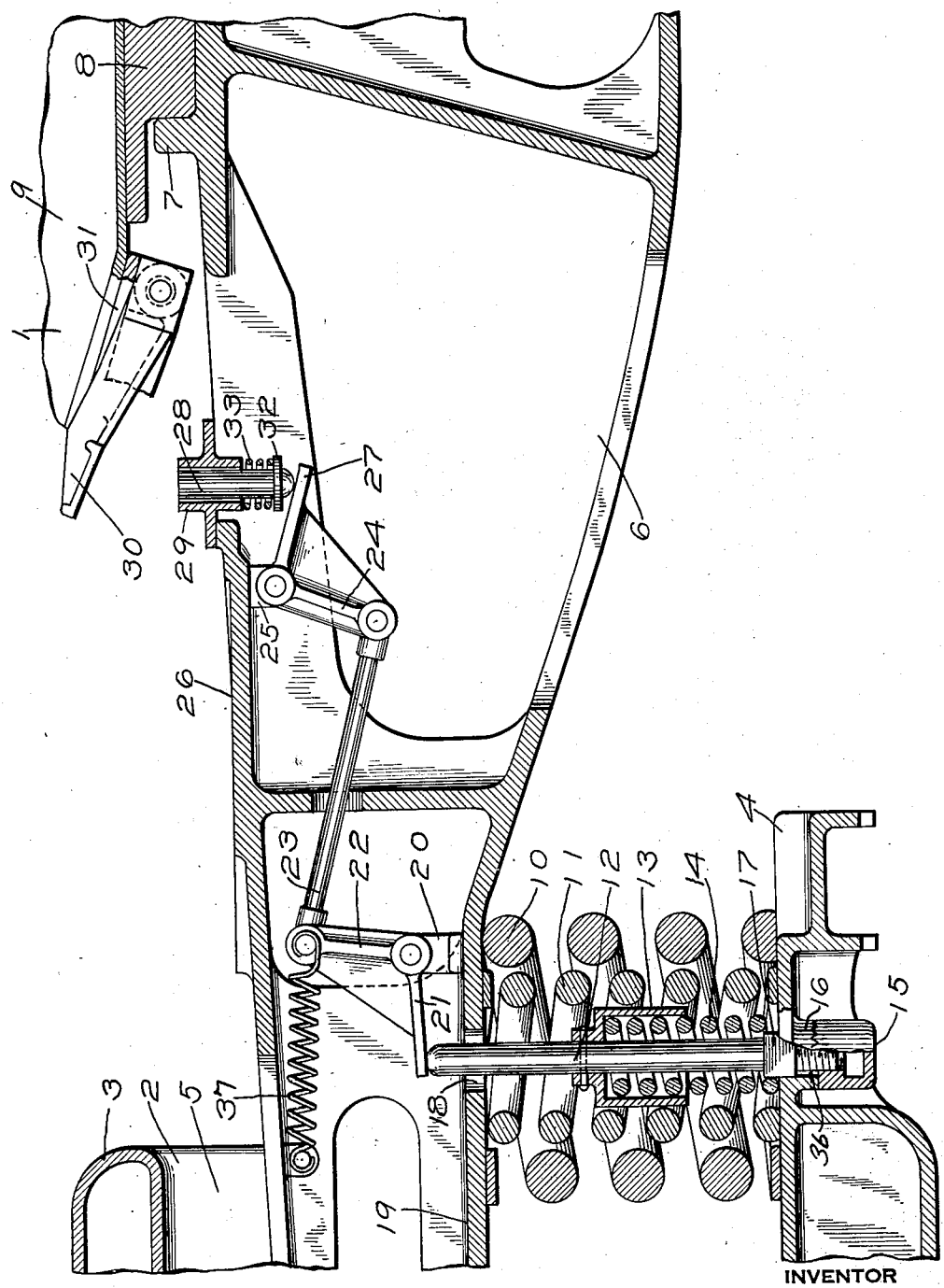

2,096,487

UNITED STATES PATENT OFFICE 2,096,487

LOAD BRAKE MECHANISM

Clyde C. Farmer, Pittsburgh, Pa., assignor to The Westinghouse Air Brake Company, Wilmerding, Pa., a corporation of Pennsylvania Application December 20, 1935, Serial No. 55,445

14 Claims. (Cl. 188—195)

This invention relates to empty and load brake equipment for vehicles and more particularly to that type of equipment adapted to be automatically set or conditioned for either light or heavy braking according to movement of the vehicle body relative to a fixed part of a truck of the vehicle under light and heavy loads.

The mechanism for conditioning empty and load brake equipment for either empty or load braking is usually carried by the vehicle body and is movable vertically therewith and is adapted to be controlled according to the position which the body assumes relative to a fixed part of a truck under light and heavy loads. This fixed part of the truck, as heretofore proposed, has been in the form of a vertically disposed strut which is supported at its lower end by the usual heavy spring plank which serves to tie the parallel side frames of the truck together in a more or less rigid manner. The upper end of the strut is adapted to cooperate with the empty and load change-over mechanism to control the mechanism for either light or heavy load service.

There is an increasing interest being shown toward the reduction in the dead weight of railway cars and toward making the trucks for such cars more flexible under the usual operating conditions. In order to attain these features it has been proposed to eliminate the heavy spring plank which ties the side frames of the truck together.

It is of course very desirable to have the control means for the empty and load change-over apparatus positioned as near as is practicable to the pivotal connection between the vehicle body and the truck where variations in the distance between the change-over apparatus and the control means therefor due to tilting of the vehicle body from one side to the other under uneven track conditions or uneven loading, will be so slight as not to interfere with or in any way change the control of the change-over apparatus. In a truck without a spring plank it is difficult to properly support the truck portion of the change-over apparatus in this position and in my application, Serial No. 53,854, filed December 11, 1935, I have disclosed how this may be done by means of a light strut support which is carried by the side frames of the truck in such a manner as not to interfere with the flexibility of the truck.

In some instances it may be desired to omit even this light strut support, and to meet such a condition, it is the principal object of the present invention to provide a truck with an empty and load brake apparatus control strut device having a strut supported directly on one of the side frames of the truck.

Other objects and advantages will appear in the following more detailed description of the invention.

In the accompanying drawing, the single figure is a fragmentary cross-sectional view of a railway vehicle truck embodying the invention, a portion of the vehicle body being shown.

Referring now in detail to the drawing, the reference character 1 indicates the vehicle body and 2 the truck, each of which may be of any desired construction. It will here be understood that the control strut device is arranged at one side of the truck as shown, and in view of this, only the left hand side of the truck has been shown and the following description will be more or less limited to the structure shown.

The truck side frame shown is of the cast metal type having upper and lower members 3 and 4, respectively, and having a bolster opening 5 for the accommodation of one end of a cast metal truck bolster 6 which extends transversely of the truck. The truck bolster, intermediate its ends, is provided with the usual center plate 7 in which is rotatably mounted a body center plate 8 carried by the body bolster 9 of the vehicle body. The truck bolster is vertically movable relative to the side frame and at each end is yieldably supported by a plurality of nests of springs which are seated on the bottom member 4 of the truck frame, only one of such nests of springs being shown. Each nest of springs may comprise outer and inner coil springs 10 and 11, respectively.

Mounted on the bottom member 4 of the side frame and extending upwardly therefrom and through the center of one nest of bolster supporting springs is a strut 12 having secured thereto, intermediate its ends, a spring seat 13. Interposed between and engaging the spring seat and the bottom member 4 of the side frame is a coil spring 14 which is initially compressed to such an extent as to at all times exert an upwardly directed force on the strut.

The lower end of the strut extends through a square opening 36 in the side frame member 4 and is slidably guided thereby so as to permit vertical adjustment of the strut relative to the member 4, which adjustment may be effected by means of an adjusting nut 15 having screw-threaded connection with the lower end portion of the strut. The spring 14 acts through the medium of the spring seat 13 to hold the upper face of the adjusting nut in engagement with the end face of a boss 16 integral with and depending downwardly from the member 4. In the present embodiment of the invention the said faces of the nut and boss are provided with serrations which interengage to hold the adjusting nut against accidental rotation relative to the boss. The strut adjacent its threaded end is provided with a square portion 17 which is adapted to engage the member 4 within the square opening in the member to prevent rotation of the strut.

The upper end of the strut extends into the interior of the truck bolster 6 through an opening 18 provided in the bottom wall 19 of the bolster.

Interiorly of the truck bolster, the wall 19 thereof is provided with an upwardly extending bracket 20 on which is rockably mounted a bell-crank lever having a horizontally disposed arm 21 which operatively engages the upper end of the strut 12, and also having an upwardly extending arm 22 which is operatively connected to one end of an operating rod 23 extending longitudinally of the bolster. The other end of the rod is operatively connected to the downwardly depending arm 24 of a bell-crank lever rockably mounted on a bracket 25 with which the upper wall 26 of the truck bolster is provided. The arm 27 of this lever is disposed at right angles to the arm 24 and operatively engages the lower end of a vertically disposed plunger 28 which is capable of vertical movement and which is slidably mounted in a guide 29 secured to the upper wall 26 of the bolster.

The upper end of the plunger is adapted to be engaged by a controlling arm 30 of the strut cylinder mechanism of the change over portion of an empty and load brake equipment. The arm 30 is pivotally mounted on a bracket 31 rigidly secured to the body bolster 9.

The portion of the empty and load brake equipment which is carried by the vehicle body may be identical with that fully disclosed in a joint application of Earle S. Cook and Ellis E. Hewitt, Serial No. 51,798 filed November 27, 1935, and since the present invention concerns the control means carried by the vehicle truck, a detailed description of the brake equipment as a whole is deemed unnecessary.

With the strut 12 adjusted to its proper length the upper horizontal end surface of the plunger 28 is flush with the upper end surface of the guide 29 when the vehicle is empty. With the plunger in this position the arm 30 is permitted to move a sufficient distance to permit the change-over apparatus to assume empty position.

At all times a coil spring 37 which is interposed between and attached to the upper wall 26 of the bolster and the arm 22 of the bell-crank which is adjacent the strut 11, acts to maintain the arm 21 in contact with the upper end of the plunger to prevent chatter when the vehicle is in transit. Interposed between and engaging the lower end of the guide 29 and a horizontally disposed collar 32 on the plunger is a coil spring 33 which acts to prevent unintentional vertical movement of the plunger relative to the arm 27 of the adjacent bell-crank lever, thus rendering the operating connection between the plunger and the arm 27 chatterless when the vehicle is in transit.

When the vehicle is being loaded, the body 1, arm 30 carried thereby, truck bolster 6 and bell-crank levers and connecting rod 23 carried by the truck bolster move downwardly as a unit relative to the side frame and strut 12 of the truck 2, the bolster compressing the supporting springs 10 and 11. As the bolster thus moves, the bell-crank lever which is in engagement with the strut 12 exerts a slight downwardly directed pressure on the strut, but such pressure will not cause the strut to move downwardly relative to the side frame for the reason that the spring 14 is of such a value as to entirely prevent this from occurring. The strut 12 being thus held against unwanted vertical movement relative to the side frame of the truck and the bell-crank lever mechanism being in operative engagement with the strut, the lever mechanism is caused to operate to maintain the plunger 28 in substantially its original position with relation to the side frame of the truck and the strut 12. From this it will be noted that as the bolster moves downwardly relative movement between the side frame and strut 12 is not permitted and that the bell-crank lever mechanism functions to maintain the plunger 28 stationary, the bolster moving relatively to the plunger. Since the arm 30 moves downwardly with the vehicle body relative to the upper surface of the plunger the permissible movement of the arm 30 relative to the plunger is reduced. When the vehicle is loaded to slightly more than one-half of its capacity, the distance between the arm 30 and plunger 28 will have been reduced by movement of the body relative to the plunger to such an extent that the arm and thereby the change-over apparatus will be prevented from moving to empty position and the equipment will assume load braking position when the strut cylinder mechanism which operates the arm is caused to function to condition the brake equipment.

If, for any reason, the plunger should not be flush with the upper end of the guide 29 when the vehicle is empty, the adjusting nut 15 will be rotated by means of a wrench or other tool until such relationship between the plunger and guide is obtained. If the upper end of the plunger is below the upper edge of the guide 29 the adjusting nut 15 when turned in a counter-clockwise direction will permit the spring 14 to move the plunger upwardly relative to the bottom member 4 of the side frame. The plunger as it is thus moved causes the bell-crank levers to operate to move the plunger 28 upwardly. When the plunger is properly positioned, the one making the adjustment will cease turning the adjusting nut. If the upper end of the plunger is above the upper end of the guide 29 the adjusting nut is rotated in a clockwise direction, pulling the strut 12 downwardly relative to the member 4 of the side frame. As the strut is thus moved, the spring 37 acts to move the bell-cranks to permit the plunger to move downwardly until the adjustment of the strut is stopped. It will be noted that as the adjusting nut is rotated the strut 12 is prevented from turning by means of the square portion of the strut engaging with the side frame.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. The combination in a vehicle truck, a truck side frame, a member movable vertically relative to said side frame and carried thereby, a mechanism control element loosely associated with the movable member and having a proper control position with relation to said side frame, and a mechanism carried by said side frame and movable member operative to maintain the control element in its proper control position regardless of the movement of the movable member relative to the truck side frame.

2. The combination in a vehicle truck, a truck side frame, a member movable vertically relative to said side frame and carried thereby, a mechanism control element loosely associated with the movable member, a control strut supported on said side frame, and a mechanism carried by said movable member cooperating with said strut and control element for supporting the control element against vertical movement by the movable member.

3. The combination in a vehicle truck, a truck side frame, a member movable vertically relative to said side frame and carried thereby, a vertically disposed mechanism control element loosely associated with said movable member, a vertically disposed strut carried by said side frame, and a mechanism extending longitudinally of the movable member and cooperating with said strut, movable member and control element to support the control element against vertical movement by the movable member.

4. The combination in a vehicle truck having a fixed part and a part which is movable vertically relative to said fixed part, a mechanism control element loosely associated with the movable part and having a proper control position with relation to said fixed part, and means carried by said movable part and cooperating with said fixed part and said control element for preventing vertical movement of the movable part from changing the position of said control element.

5. The combination in a vehicle truck, a truck side frame, a strut carried by said side frame, a truck bolster movable vertically relative to the side frame and strut, a mechanism control element loosely carried by the truck bolster and having a proper control position with relation to said truck side frame, and means carried by said bolster and cooperating with said strut and control element for maintaining said control element in said position regardless of vertical movement of the truck bolster.

6. The combination in a vehicle truck, a truck side frame, a strut carried by said side frame, a truck bolster movable vertically relative to the side frame and strut, a mechanism control element loosely carried by the truck bolster and having a proper control position with relation to said truck side frame, and a mechanism comprising a plurality of operatively connected levers pivotally mounted on said truck bolster and cooperating with said strut and control element to maintain the control element in said position regardless of the vertical movement of the truck bolster.

7. The combination in a vehicle truck, a truck side frame, a member movable vertically relative to said side frame and carried thereby, a mechanism control element loosely associated with the movable member and having a proper control position with relation to said side frame, a mechanism carried by said side frame and movable member operative to maintain the control element in its proper control position regardless of the movement of the movable member relative to the truck side frame, and means cooperating with said side frame and mechanism operative to move said control element vertically relative to the vertically movable member.

8. The combination in a vehicle truck having a fixed part and a part which is movable vertically relative to said fixed part, a mechanism control element loosely associated with the movable part and having a proper control position with relation to said fixed part, means carried by said movable part and cooperating with said fixed part and said control element for preventing vertical movement of the movable part from changing the position of said control element, and means for operating said mechanism to move said control element relative to the movable part.

9. The combination in a vehicle truck, a truck side frame, a strut carried by said side frame, a truck bolster movable vertically relative to the side frame and strut, a mechanism control element loosely carried by the truck bolster and having a proper control position with relation to said truck side frame, means carried by said bolster and cooperating with said strut and control element for maintaining said control element in said position regardless of vertical movement of the truck bolster, and means cooperating with said side frame and strut operative to effect the movement of said strut to actuate said means to move the control element relative to said truck bolster.

10. The combination in a vehicle truck, a truck side frame, a strut carried by said side frame, a truck bolster movable vertically relative to the side frame and strut, a mechanism control element loosely carried by the truck bolster and having a proper control position with relation to said truck side frame, means carried by said bolster and cooperating with said strut and control element for maintaining said control element in said position regardless of vertical movement of the truck bolster, said strut being movable vertically to effect the operation of said mechanism to move the control element relative to the truck bolster, and means engaging said side frame and strut for effecting the vertical movement of the strut.

11. In combination, a vehicle truck having a side frame, an element associated with and movable vertically relative to the side frame, a control member spaced laterally from the side frame and carried by said element, and a mechanism operatively connecting said side frame and control member to prevent movement of said member relative to the side frame.

12. In combination, a vehicle truck having a side frame, an element associated with and movable vertically relative to the side frame, a control member spaced laterally from the side frame and carried by said element, and a mechanism carried by said element and operatively connecting said side frame and control member to prevent movement of the member relative to the side frame.

13. In combination, a vehicle truck having a side frame and a truck bolster, a member rigidly carried by said side frame, a control element laterally spaced from said member and associated with said truck bolster, and a mechanism operatively connecting said member with said element, to maintain said element in fixed relation with said member.

14. In combination, a vehicle truck having a side frame and a truck bolster, a member rigidly carried by said side frame, an element laterally spaced from said member for controlling the adjustment of an empty and load brake according to the position of the element relative to the truck bolster, and a mechanism operatively connecting said member with said element, to maintain said element in fixed relation with said member.

CLYDE C. FARMER.